(12) United States Patent
Eleftherakis et al.

(10) Patent No.: US 10,130,903 B2
(45) Date of Patent: Nov. 20, 2018

(54) FILTER WITH DUAL PLEAT PACK

(71) Applicant: Filtran LLC, Des Plaines, IL (US)

(72) Inventors: John G. Eleftherakis, Cary, IL (US); Ibrahim Khalil, Lake Barrington, IL (US); Conrad F. Alfaro, Bolingbrook, IL (US)

(73) Assignee: FILTRAN LLC, Des Plaines, IL (US)

( * ) Notice: Subject to any disclaimer, the term of this patent is extended or adjusted under 35 U.S.C. 154(b) by 414 days.

(21) Appl. No.: 13/755,134

(22) Filed: Jan. 31, 2013

(65) Prior Publication Data

US 2014/0209528 A1    Jul. 31, 2014

(51) Int. Cl.
*B01D 29/00* (2006.01)
*B01D 29/07* (2006.01)
*B01D 29/52* (2006.01)
*B01D 35/30* (2006.01)
*B01D 29/01* (2006.01)
*B01D 29/56* (2006.01)

(52) U.S. Cl.
CPC ........... *B01D 29/07* (2013.01); *B01D 29/012* (2013.01); *B01D 29/52* (2013.01); *B01D 29/56* (2013.01); *B01D 35/303* (2013.01); *Y10T 29/49826* (2015.01)

(58) Field of Classification Search
None
See application file for complete search history.

(56) References Cited

U.S. PATENT DOCUMENTS

| 3,747,772 | A | * | 7/1973 | Brown | B01D 29/012 |
| | | | | | 210/493.1 |
| 4,863,602 | A | * | 9/1989 | Johnson | B01D 29/11 |
| | | | | | 210/484 |
| 4,904,397 | A | | 2/1990 | Eimer et al. | |
| 4,976,858 | A | | 12/1990 | Kadoya | |
| 5,397,632 | A | * | 3/1995 | Murphy et al. | 442/358 |
| 6,156,089 | A | * | 12/2000 | Stemmer | B01D 46/0036 |
| | | | | | 55/467 |
| 6,416,570 | B2 | | 7/2002 | Goto et al. | |
| 7,845,500 | B2 | | 12/2010 | Hueppchen et al. | |
| 7,875,171 | B2 | | 1/2011 | Pekarsky et al. | |
| 8,246,819 | B2 | | 8/2012 | Sakata et al. | |

(Continued)

FOREIGN PATENT DOCUMENTS

DE    20006981    7/2000
EP    1733775 A1    12/2006

(Continued)

OTHER PUBLICATIONS

Kikumi JP2001120937 Machine Translation.pdf—Kikumi, Osamu—May 2001.*

(Continued)

*Primary Examiner* — Krishnan S Menon
*Assistant Examiner* — Bradley R Spies
(74) *Attorney, Agent, or Firm* — Grossman, Tucker, Perreault & Pfleger, PLLC

(57) ABSTRACT

A fluid filter apparatus comprising an upper housing shell; a lower housing shell; a pleat pack element comprising a peripheral frame and a folded pleated media. The frame is at least partially molded over the media to secure the media in the frame, and the media comprises two or more types of media of different densities from each other.

26 Claims, 17 Drawing Sheets

(56) References Cited

U.S. PATENT DOCUMENTS

| | | | |
|---|---|---|---|
| 9,004,291 | B2 | 4/2015 | Saito et al. |
| 9,084,950 | B2 | 7/2015 | Saito et al. |
| 2004/0144716 | A1 | 7/2004 | Kobayashi et al. |
| 2005/0230324 | A1* | 10/2005 | Peet et al. ............... 210/767 |
| 2006/0169632 | A1 | 8/2006 | Suzuki et al. |
| 2006/0180541 | A1* | 8/2006 | Hueppchen ........ B01D 35/0273 210/450 |
| 2007/0151906 | A1* | 7/2007 | Beer et al. ................ 210/130 |
| 2008/0245721 | A1* | 10/2008 | Asahina ............. B01D 27/005 210/248 |
| 2008/0290013 | A1* | 11/2008 | Stausberg et al. ....... 210/167.04 |
| 2011/0174704 | A1* | 7/2011 | Yamada ................ B01D 29/01 210/137 |
| 2011/0259810 | A1 | 10/2011 | Sakata et al. |
| 2013/0008845 | A1 | 1/2013 | Saito et al. |
| 2013/0146526 | A1* | 6/2013 | Saito et al. .............. 210/435 |
| 2015/0265950 | A1 | 9/2015 | Norris et al. |

FOREIGN PATENT DOCUMENTS

| | | |
|---|---|---|
| FR | 2989444 | 10/2013 |
| GB | 2374298 | 10/2002 |
| JP | 58-189015 | 11/1983 |
| JP | 63-141618 | 9/1988 |
| JP | 64-43324 | 2/1989 |
| JP | 4-915 | 1/1992 |
| JP | 2000-079718 | 10/2000 |
| JP | 2001120937 A * | 5/2001 |
| JP | 2003-042272 | 2/2003 |
| JP | 2004-363783 | 12/2004 |
| JP | 2006-316902 | 11/2006 |
| JP | 2007-327413 | 12/2007 |

OTHER PUBLICATIONS

International Search Report & Written Opinion for PCT/US14/13910 dated Apr. 3, 2014; 9 pages.
International Search Report and Written Opinion from related PCT Appln. No. PCT/US14/13919 dated Apr. 3, 2014.
Office Action from related Korean Appln. No. 10-2015-0064017 dated Jun. 24, 2016. English translation attached.
Search Report from related EPO Appln. No. 15165371.4 dated Jul. 14, 2015.
Notice of Allowance from related Korean Appln. No. 10-2015-0064017 dated Mar. 29, 2017. English translation attached.
Office Action from related Japanese Appln. No. 2015-556135, dated Nov. 6, 2017. English translation attached.
Office Action from related Japanese Appln. No. 2015-556135, dated Aug. 13, 2018. English translation attached.

* cited by examiner

FILTER WITH DUAL PLEAT PACK

BACKGROUND

1. Technical Field

The invention relates generally to the field of filtration. More specifically, some embodiments of the invention relate to filters that are used to filter liquids such as engine oil or transmission oil in engines such as vehicle engines.

2. Background

Various filtration devices are known. More specifically, filtration devices are known that are used in engine and/or vehicle applications, for example in the filtration of automotive transmission fluid. Some devices provide a housing forming a chamber containing a filtration media such as, for example, a felt type media that is permeable to the fluid but traps particles or other contaminants.

Accordingly, it would be desirable to have a filter device and method that can provide desired levels of filtration, compactness, and/or manufacturability.

SUMMARY OF THE INVENTION

In light of the present need for filters such as transmission filters, a brief summary of various exemplary embodiments is presented. Some simplifications and omissions may be made in the following summary, which is intended to highlight and introduce some aspects of the various exemplary embodiments, but not to limit the scope of the invention. Detailed descriptions of preferred exemplary embodimentd adequate to allow those of ordinary skill in the art to make and use the inventive concepts will follow in later sections.

In some aspects, a fluid filter apparatus comprises: an upper housing shell; a lower housing shell; a pleat pack element comprising a peripheral frame and a folded pleated media, wherein the frame is at least partially molded over at least some edges the media to secure the media in the frame, wherein the media comprises two types of media of different filtration densities from each other.

In some aspects a fluid filter apparatus comprises: a housing forming an enclosure; a pleat pack element comprising a peripheral frame and a folded pleated media, wherein the frame is at least partially molded over at least some edges the media to secure the media in the frame, wherein the media comprises two types of media of different filtration densities from each other, wherein the two different types of pleas pack media are in a parallel arrangement in the direction of flow with respect to each other.

In some aspects a method of making a fluid filter apparatus comprises: providing a housing; providing a pleat pack element comprising a peripheral frame and a folded pleated media, by at least partially molding frame material over at least some edges the media to secure the media in the frame; and forming an enclosure with the housing so that the pleat pack element is enclosed inside the housing, and wherein the media comprises two types of media of different filtration densities from each other, wherein the two different types of pleas pack media are in a parallel arrangement in the direction of flow with respect to each other.

The foregoing objects and advantages of the invention are illustrative of those that can be achieved by the various exemplary embodiments and are not intended to be exhaustive or limiting of the possible advantages which can be realized. Thus, these and other objects and advantages of the various exemplary embodiments will be apparent from the description herein or can be learned from practicing the various exemplary embodiments, both as embodied herein or as modified in view of any variation that may be apparent to those skilled in the art. Accordingly, the present invention resides in the novel methods, arrangements, combinations, and improvements herein shown and described in various exemplary embodiments.

BRIEF DESCRIPTION OF THE DRAWINGS

In order to better understand various exemplary embodiments, reference is made to the accompanying drawings, wherein.

DETAILED DESCRIPTION

Figure 1:
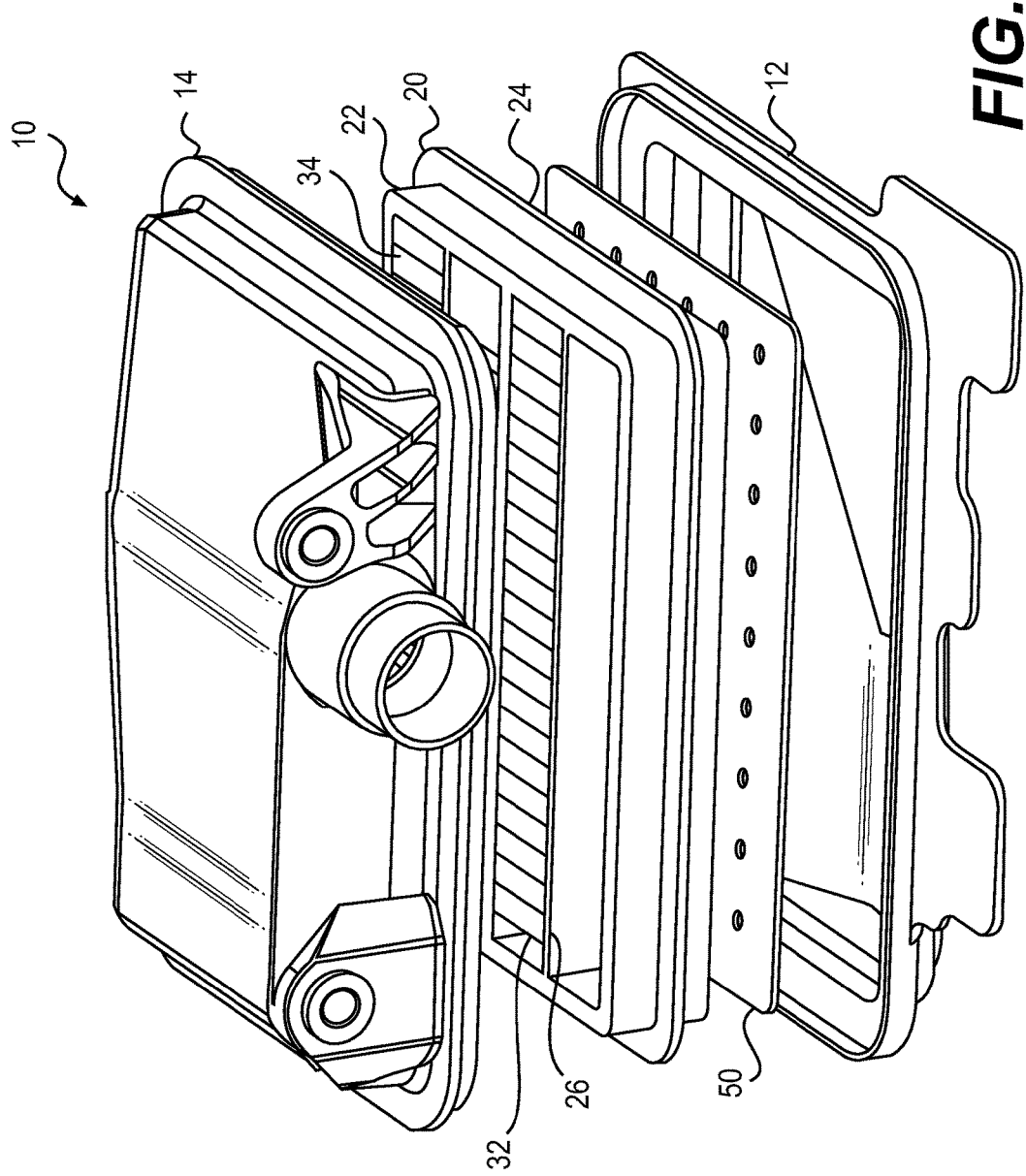
FIG. 1 is an exploded view of a filter according to a first preferred embodiment.
Figure 2:
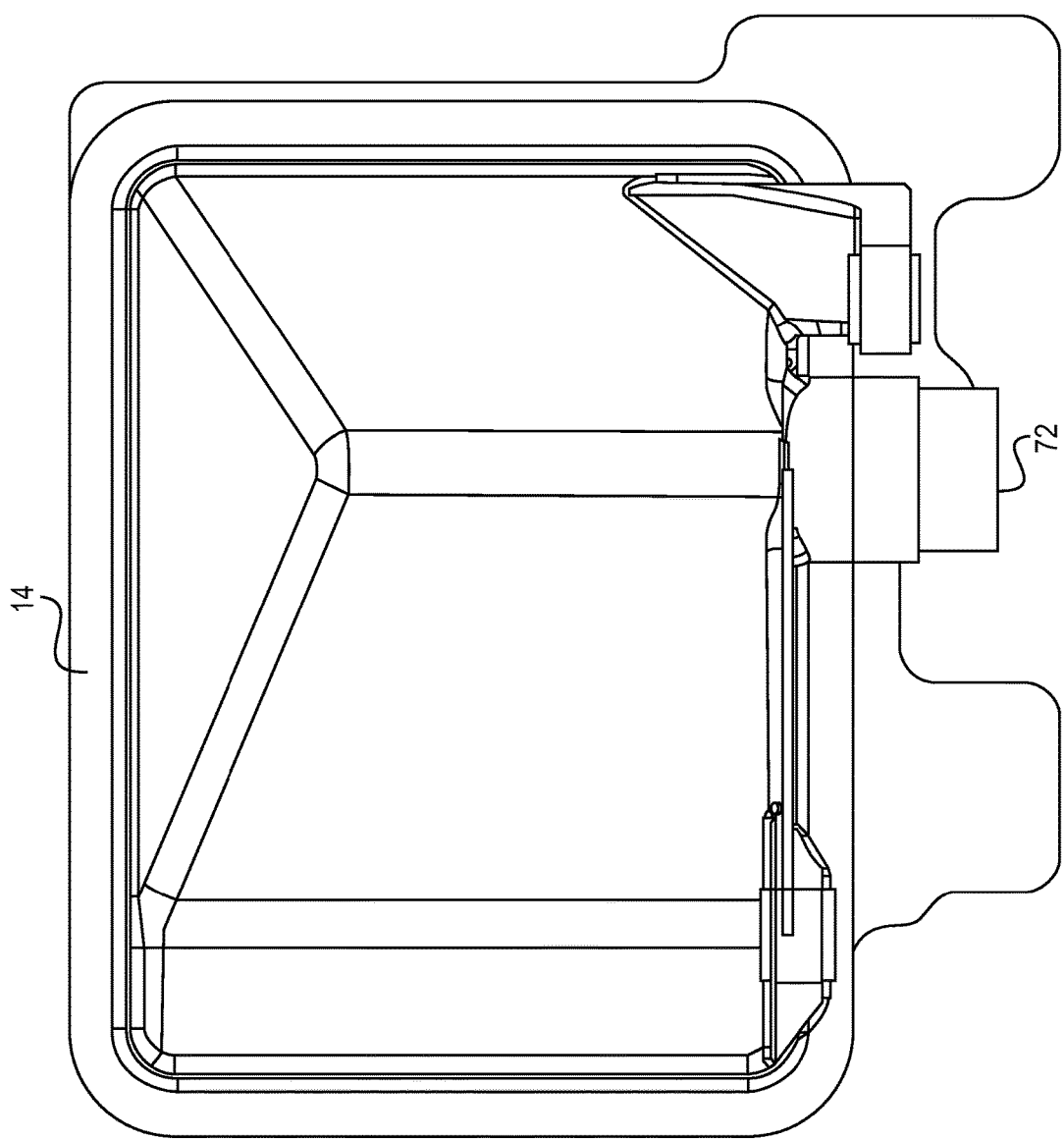
FIG. 2 is a top view of the filter of FIG. 1.
Figure 3:
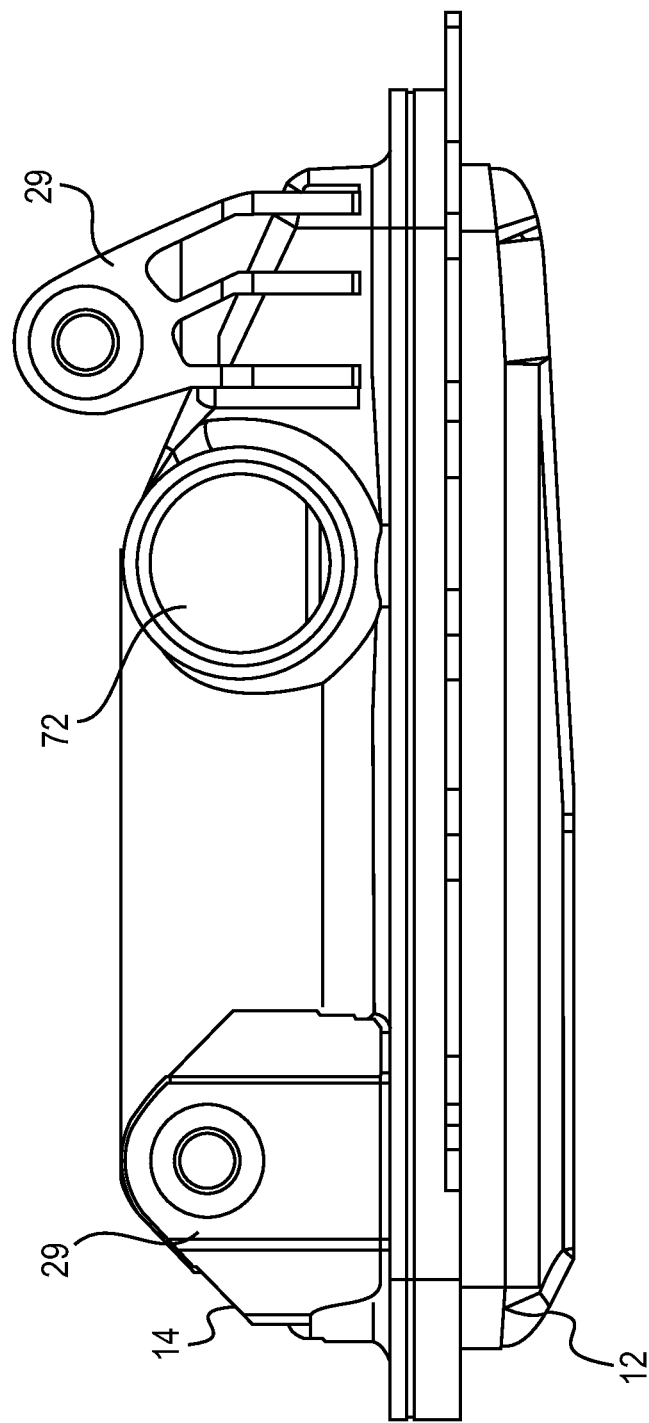
FIG. 3 is a side view of the filter of FIG. 1.
Figure 4:
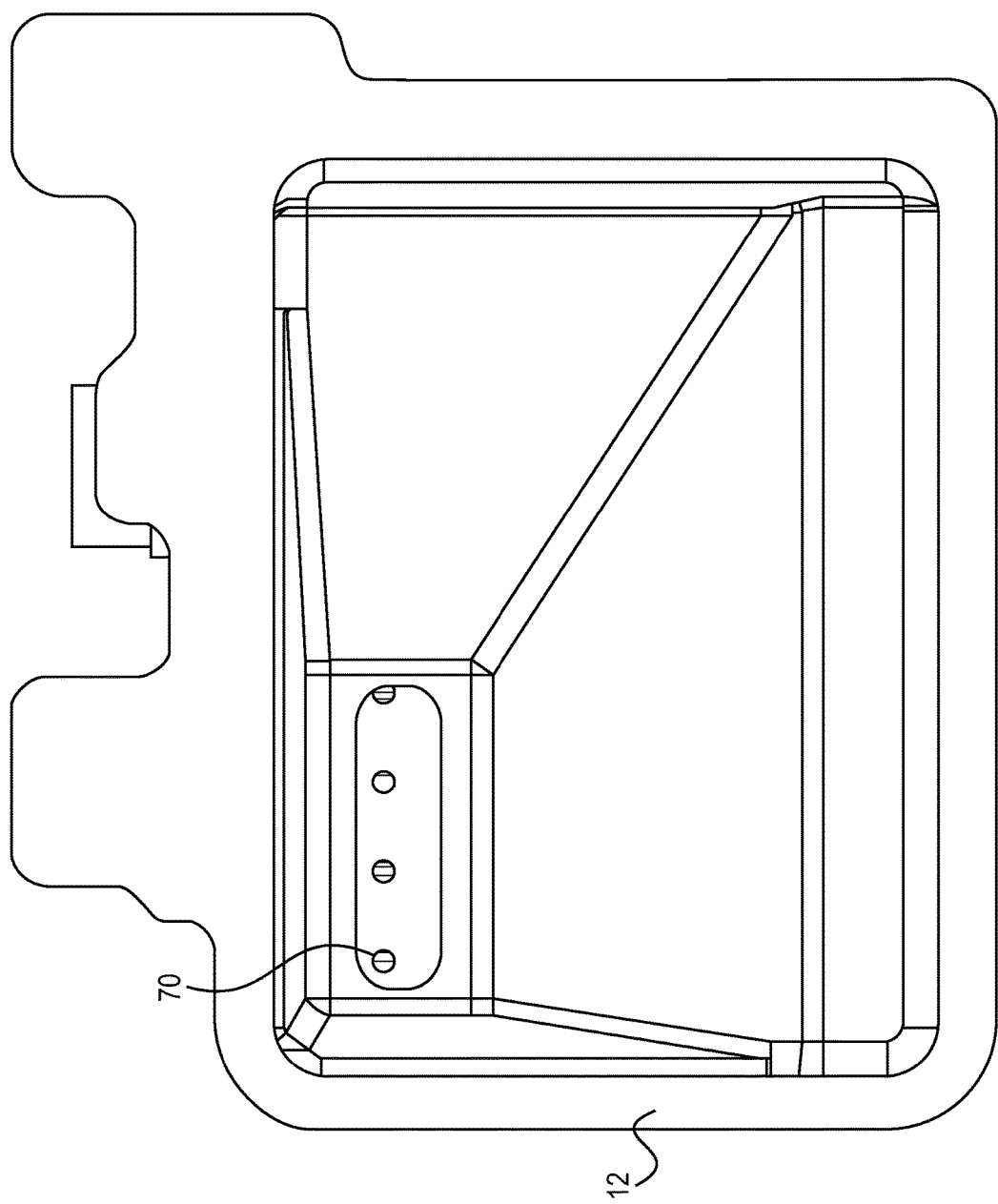
FIG. 4 is a bottom view of the filter of FIG. 1.
Figure 5:
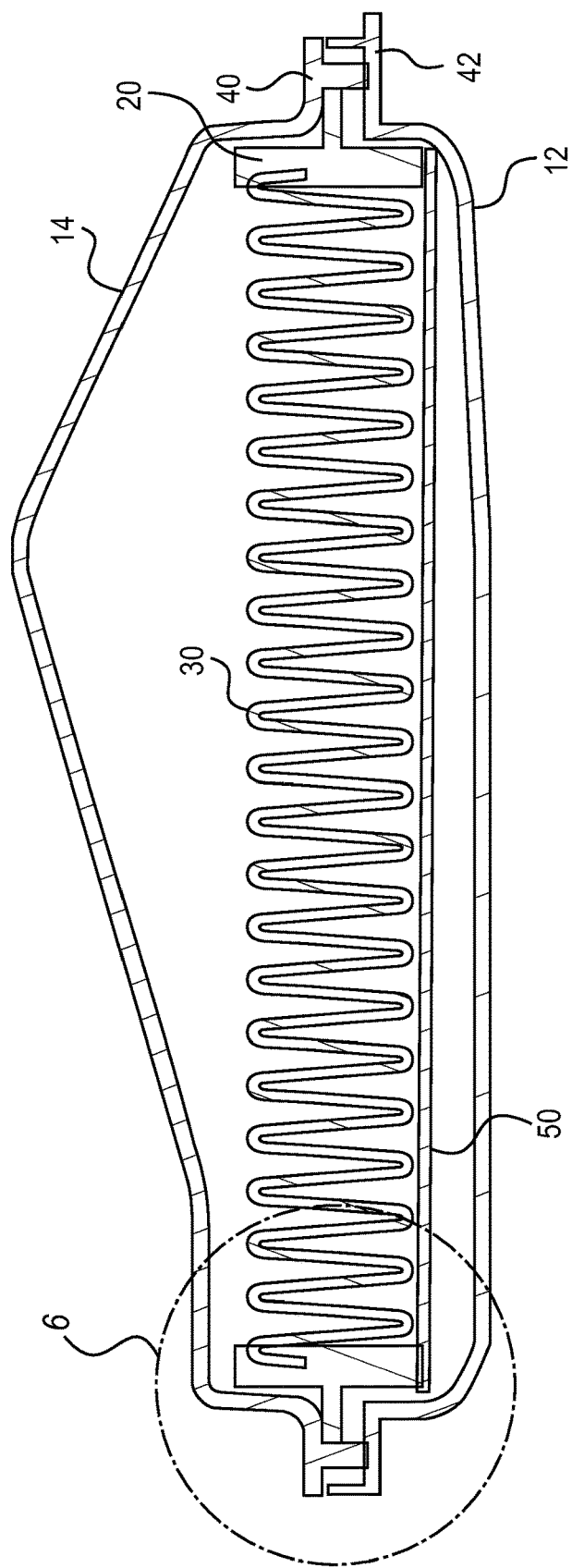
FIG. 5 is a side cross-sectional view of the filter of FIG. 1.

Some embodiments of the present invention relate to filters, such as automotive transmission fluid filters. Some embodiments will now be described with reference to the drawing figures in which like numbers generally designate like parts throughout.

FIGS. 1-6 illustrate a first preferred embodiment. A filter 10 is provided which includes a lower housing shell 12 and an upper housing shell 14. The lower and upper housings 12 and 14 may each be made of for example a molded plastic material, or one or both could be made of stamped metal, for example.

Disposed in between the lower and upper housing shells 12 and 14 is a pleat pack element 20. The pleat pack element 20 comprises generally a peripheral frame 22 having an outward projecting flange 24, which may also be made of molded plastic. Internal strengthening or dividing ribs 26 may also be provided. The overall assembly comprising the pleat pack element 20 including the frame 22, flange 24, and stiffening ribs 26 is over-molded onto filtration media 30 which may comprise one or more media types, such as a first pleated media, or media section, 32, and a second pleated media, or media section, 34. Thus, the pleat pack 20 may contain only one type of media, two similar media, two dissimilar media or more types. In this manufacturing process, at least one or some of the media 30 is pleated or folded in a zigzag fashion and is retained in place within the mold while the heated plastic is injected into the mold. After cooling, a unitary pleat pack element 20 results. The media 30 is held in place by its interaction with the cooled rigid surrounding plastic structure, which forms the frame 22, the flange 24, and/or the ribs 26, for example as an integral unit with the media 30.

Figure 6:
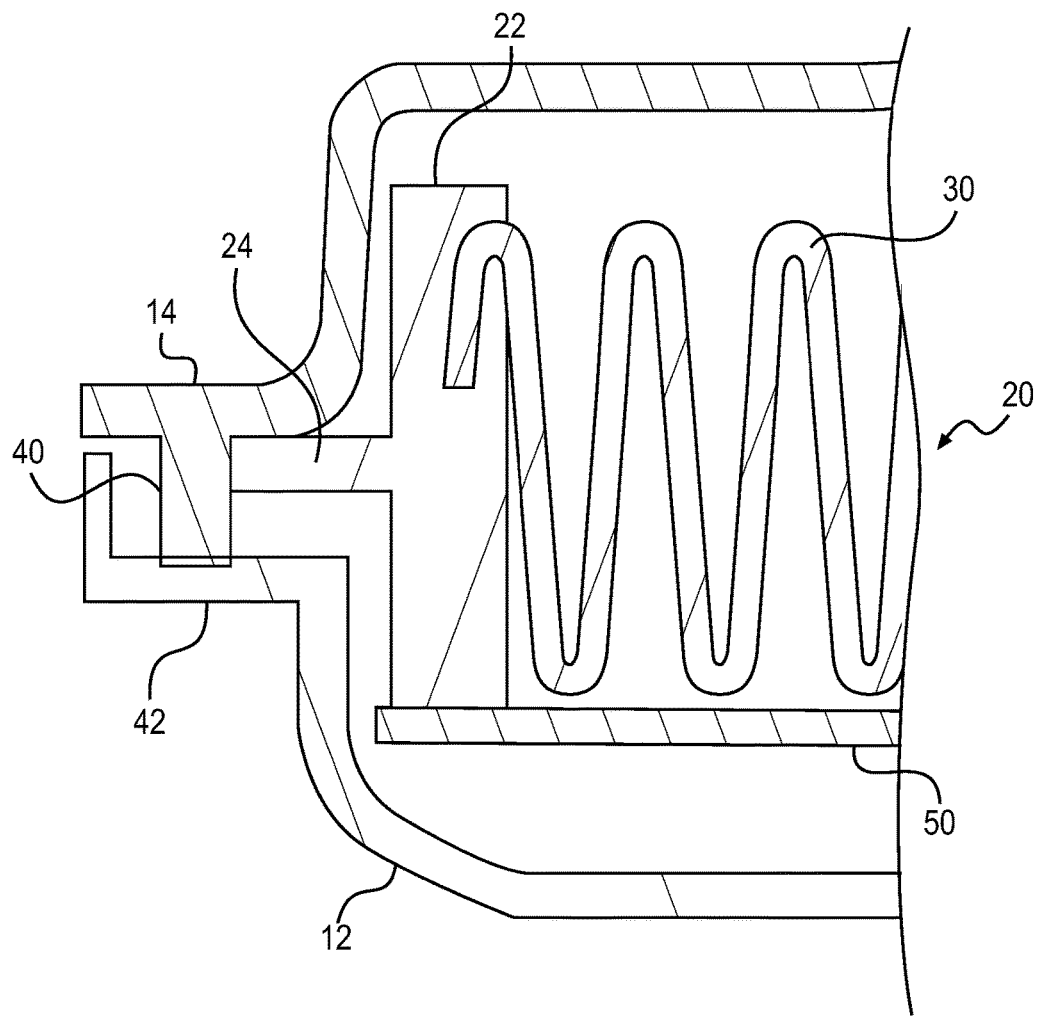
FIG. 6 is a detailed view of a portion of FIG. 5.
Figure 7:
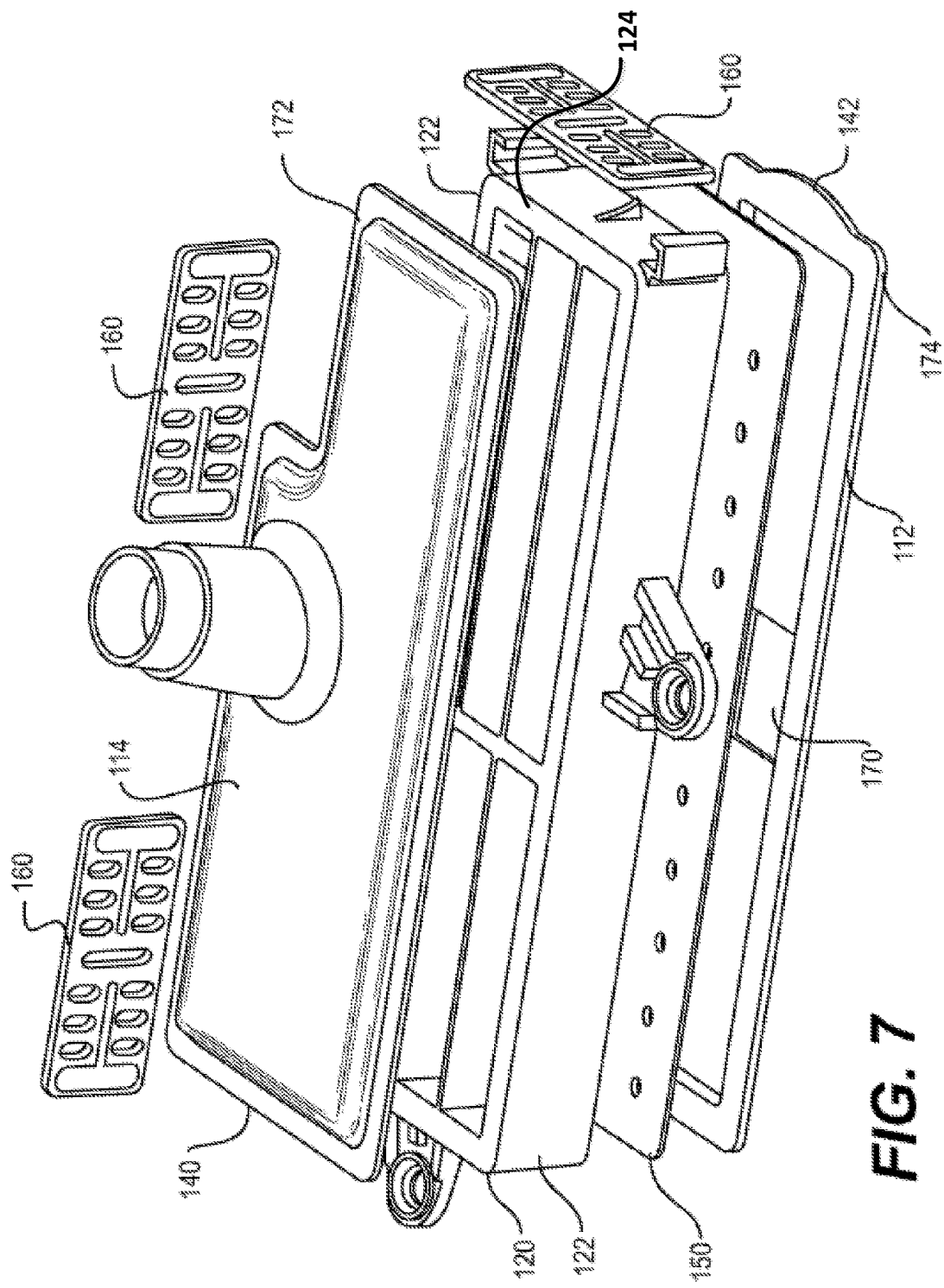
FIG. 7 is an exploded view of a second preferred embodiment of a filter.
Figure 8:
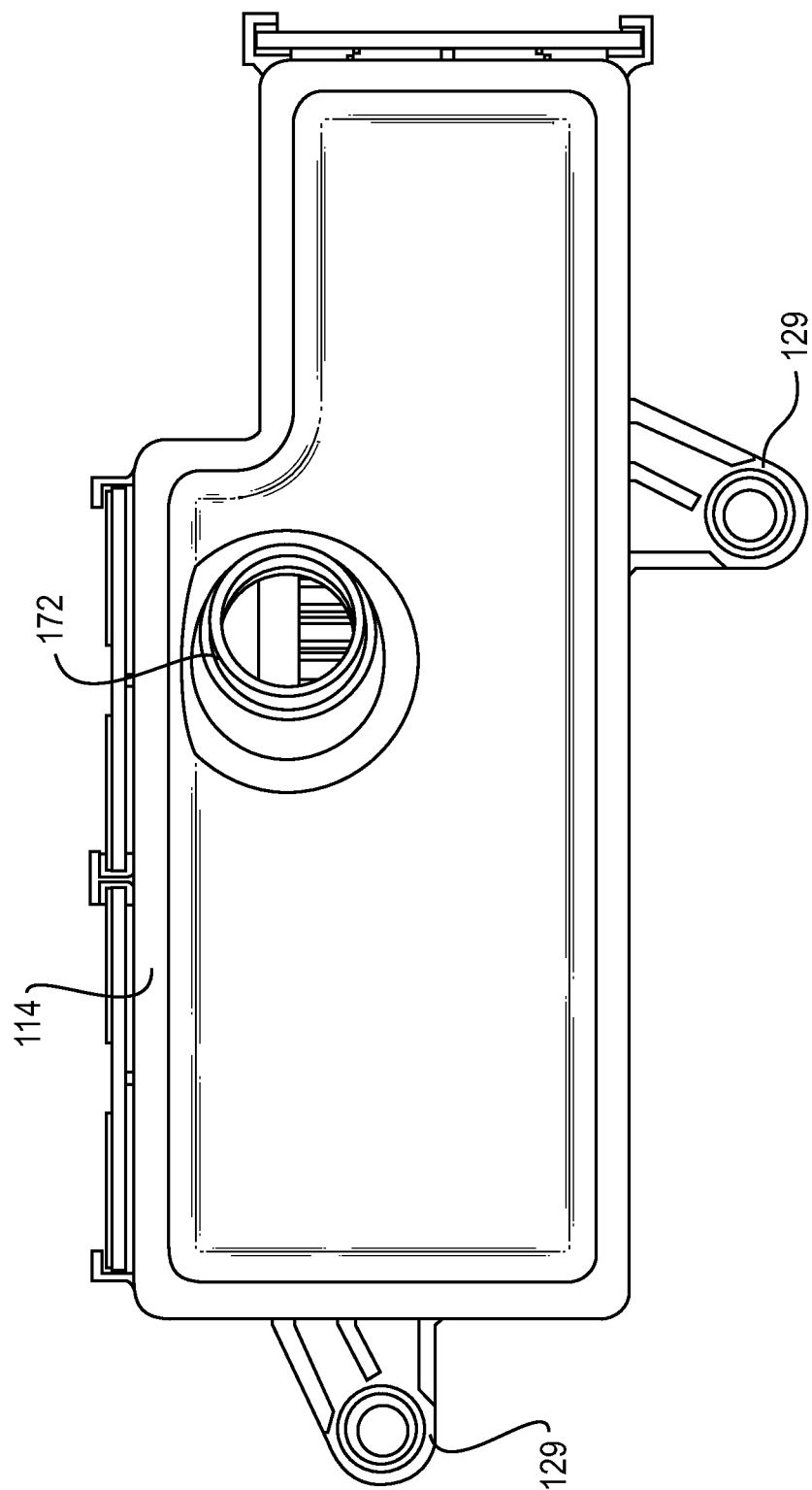
FIG. 8 is a top view of the filter of FIG. 7.
Figure 9:
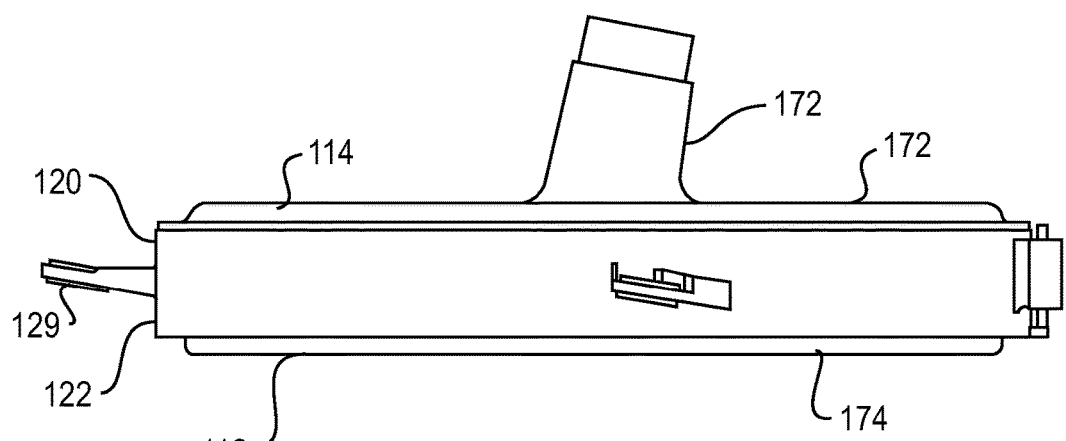
FIG. 9 is a side view of the filter of FIG. 7.
Figure 10:
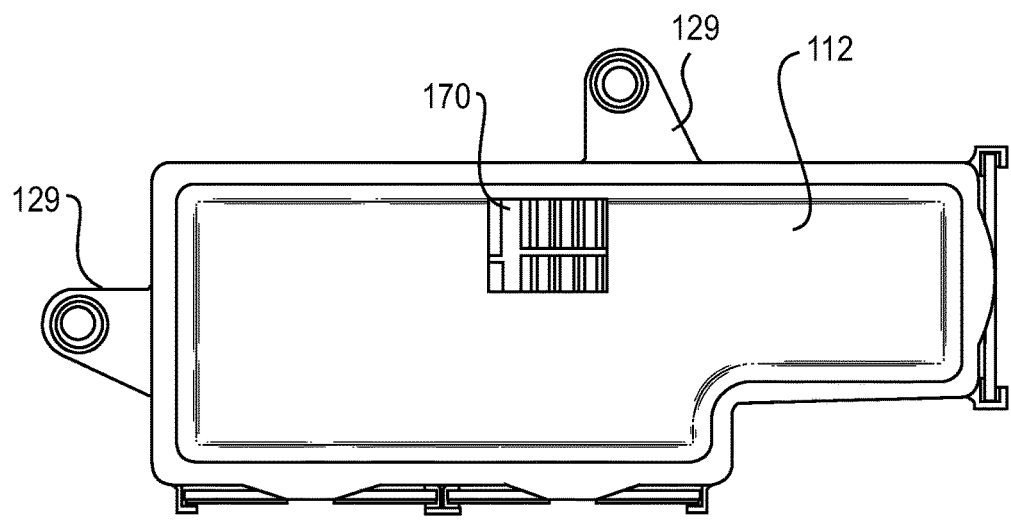
FIG. 10 is a bottom view of the filter of FIG. 7.
Figure 11:
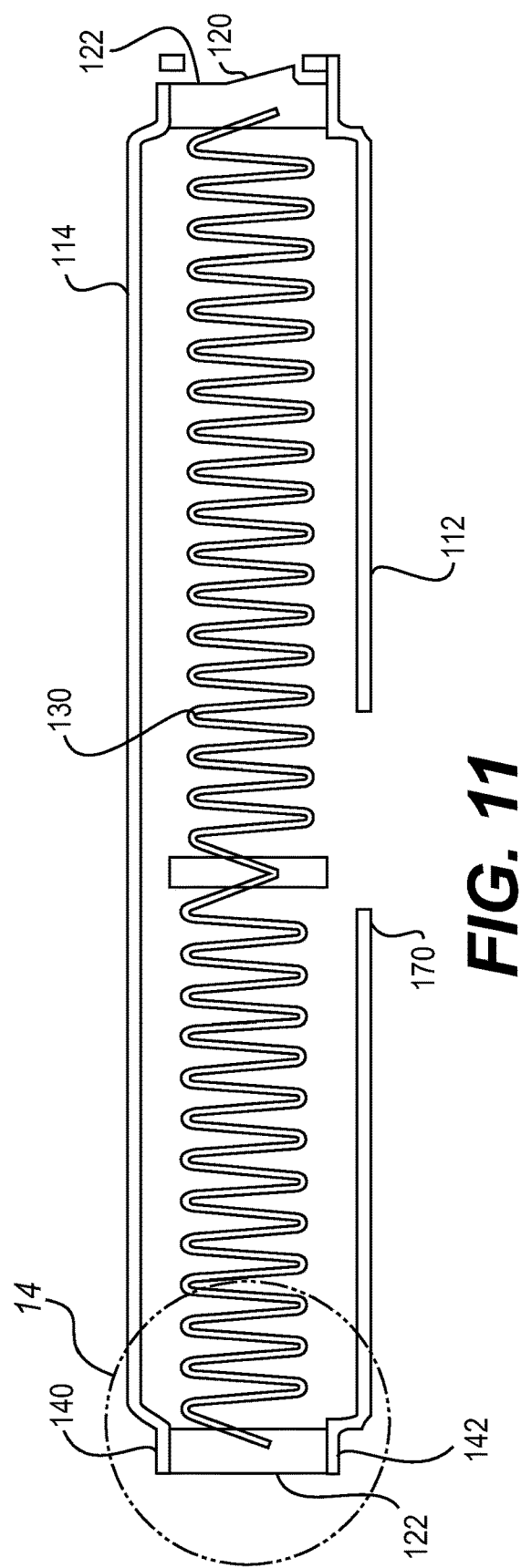
FIG. 11 is a side cross-sectional view of the filter of FIG. 7.

Particularly in the detailed view of FIG. 6, it can be seen that the media 30 is encapsulated at its ends and sides within the molded frame 22 during manufacturing, while leaving exposed regions of the media 30 for fluid to pass through.

The illustrated pleat pack assembly, or pleat pack element, 20 provides for convenient manufacture in that multiple separate components can each be individually molded and then assembled to form a finished filter 10. The lower housing 12 and the upper housing 14 are separate components from each other. The pleat pack 20 is also a separate component. In the embodiment of FIGS. 1-6 the upper housing 14 may have a peripheral flange 40 that can abut against a peripheral flange 42 of the lower housing 12. The flanges 40 and 42 may be vibration welded or friction welded together by, e.g., a conventional welder. Laser welding or adhesive bonding may also be employed as an alternative. Upon the completion of vibration welding or other attachment of the flange 40 to the flange 42, the upper housing 14 becomes attached to the lower housing 12 to form an enclosure. The pleat pack 20 is trapped due to its shape such that its frame 22 and/or the outer flange 24 is physically retained within the enclosure. Supporting arms or bosses 29 may be provided, such as shown on upper housing 14.

The embodiment of FIGS. 1-6 also shows an optional additional filter media 50. In this example, the additional filter media 50 is a flat sheet type media which may have holes spaced evenly through it. This sheet type media 50 may be a coarser media than any of the media 30 thus providing some degree of pre-filtration.

The illustrated embodiment of FIGS. 1-6 shows two sections of media 32 and 34, although more sections may also be provided. From the illustrated embodiment, the media 30 is arranged in two rows or sections 32 and 34, although the media 30 may be arranged in one contiguous section or in three rows, four rows or more. These sections of media 32 and 34 may be of the same density, or alternatively one media may be denser than the other. Therefore, it will be appreciated that various degrees of filtration density and efficiency may be provided within one pleat pack 20 if desired. Moreover, pre-filtration can be accomplished by the additional media 50, which in this example is a flat sheet.

A fluid inlet 70 is provided on the lower housing 12, and a fluid outlet 72 is provided on the upper housing 14.

FIGS. 7-14 illustrate a second preferred embodiment. The variations on materials, number of media types and other variations described with respect to the first embodiment also apply to this embodiment and are not necessarily repeated in the text regarding this embodiment. A filter is provided which includes a lower housing 112 and an upper housing 114. The lower and upper housings 112 and 114 may each be made of for example a molded plastic material or metal.

Disposed in between the lower and upper housing shells 12 and 14 is a pleat pack element 20. The pleat pack element 20 comprises generally a peripheral frame 22 having an outward projecting flange 24, which may also be made of molded plastic. Internal strengthening or dividing ribs 26 may also be provided. The overall assembly comprising the pleat pack element 20 including the frame 22, flange 24, and stiffening ribs 26 is over-molded onto filtration media 30 which may comprise one or more media types, such as a first pleated media, or media section, 32, and a second pleated media, or media section, 34. Thus, the pleat pack 20 may contain only one type of media, two similar media, two dissimilar media or more types. In this manufacturing process, at least one or some of the media 30 is pleated or folded in a zigzag fashion and is retained in place within the mold while heated plastic is injected into the mold. After cooling, a unitary pleat pack element 20 results. The media 30 is held in place by its interaction with the surrounding plastic structure. Particularly in the detailed view of FIG. 11, it can be seen that the media 30 is encapsulated at its ends and sides within the molded frame 22 during manufacturing, while leaving exposed regions of the media 30 for fluid to pass through.

The illustrated pleat pack assembly 120 provides for convenient manufacture in that three separate components can each be individually molded and then assembled to form a finished filter 110. This embodiment differs from the first and third embodiments in that, instead of being totally enclosed inside the chamber formed by the upper and lower housing 112 and 114, in this embodiment the frame 122 and/or flange 124 form sides of the overall housing. Thus, the lower housing 112 and upper housing 114 do not touch each other—instead the frame 122 and/or flange 124 are interposed between the peripheries of the lower and upper housings 112 and 114 and thus from the sides of the enclosure.

The lower housing 112 and the upper housing 114 are separate components from each other. The pleat pack 120 is also a separate component. The upper housing 114 will have a flange 140 that can abut one side of the frame 122, and the other side of the frame 122 abuts against a peripheral flange 142 of the lower housing 112. The flanges 140 and 142 may be vibration welded to the frame 122 or friction welded by a conventional welder. Laser welding or adhesive bonding may also be employed as an alternative. Upon the completion of vibration or other welding of the flange 140 and the flange 142 to the frame 122, the upper housing 114 and the lower housing 112 together with the frame 122 form an enclosure. The frame 122 of the pleat pack 120 is therefore part of the housing.

The embodiment of FIGS. 7-14 also shows (in FIG. 7) an optional additional filter media 150. In this example, the additional filter media 150 is a flat sheet type media which may have holes spaced evenly through it. This sheet type media 150 may be a coarser media than any of the media 130 thus providing some degree of pre-filtration.

The illustrated embodiment of FIGS. 7-14 shows two sections of media 132 and 134. From this illustrated embodiment, the media 130 is in two rows or sections, although it may be in four rows or more. These sections of media 132 and 134 may be of the same densit, or alternatively or one media may be denser than the other. Therefore, it will be appreciated that various degrees of filtration density and efficiency may be provided within one pleat pack 120 if desired. Moreover, pre-filtration can be accomplished by the flat media 150.

It will be appreciated that a distinction in this embodiment is that the upper housing 114 is joined directly to the frame 122 of the pleat pack 120. Further, the lower housing 112 is joined directly to the frame 122 of the pleat pack 120. Thus, the frame 122 of the pleat pack 120 actually forms an outer side wall of the overall filter, and also participates in enclosing the overall filter. This can provide several advantages. Using the periphery of the frame 122 as a structural side housing component can make the overall filter 110 more compact, in that when viewed in plan or top view the filter takes up less area for the same size of pleat pack 120, compared to an embodiment that has top and bottom housings that surround the periphery of the pleast pack 120, because the area that would otherwise be needed for the mated flanges of the upper and lower housings is not longer needed to surround the outer periphery of the pleat pack 120. Also, it is impossible for fluid to move through the housing without passing through the pleat pack 120; that is, no fluid can escape (while inside the housing) around the edge of the pleat pack 120 between the pleat pack flange 124 and the inside of the housings.

Figure 12:
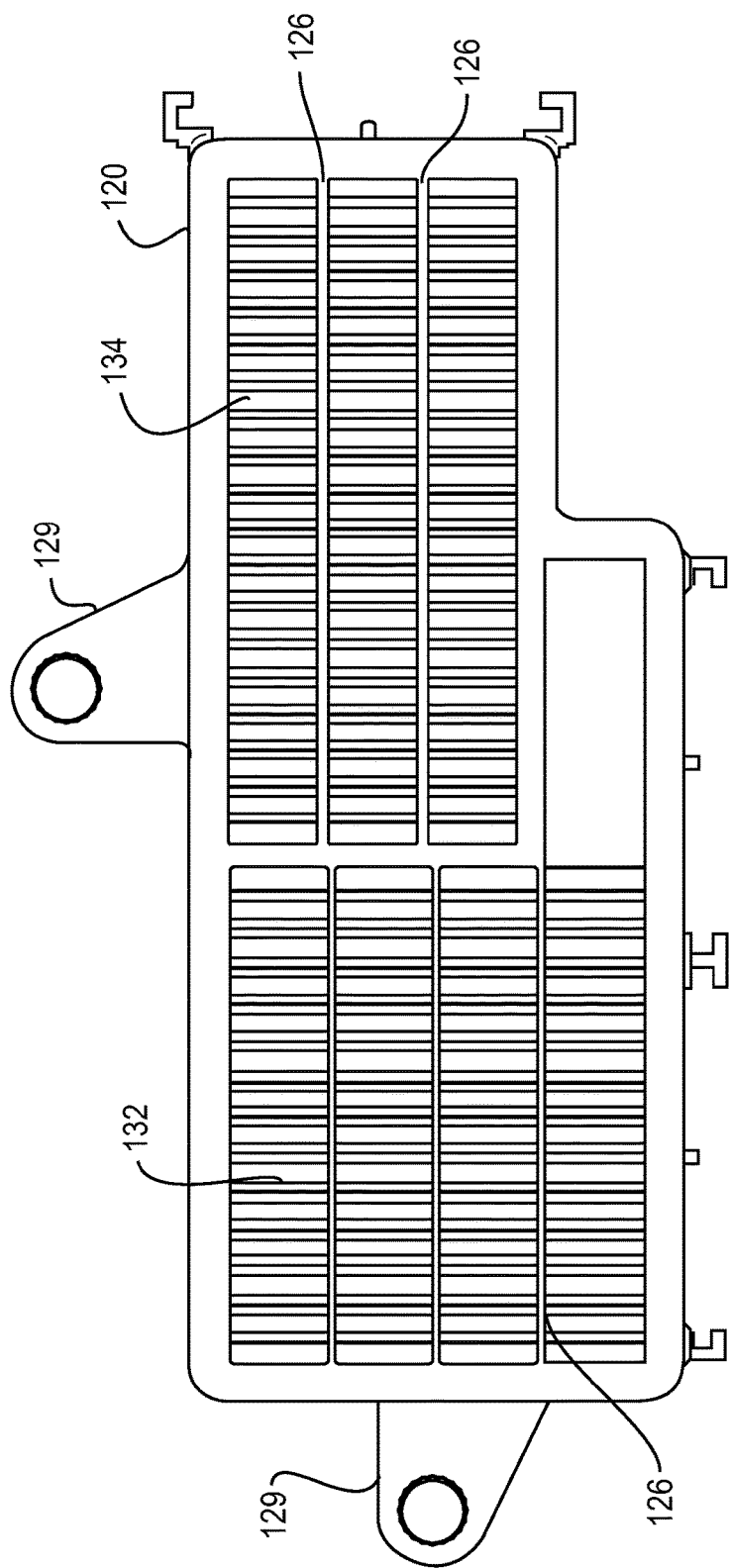
FIG. 12 is a top view of a pleat pack element.
Figure 13:
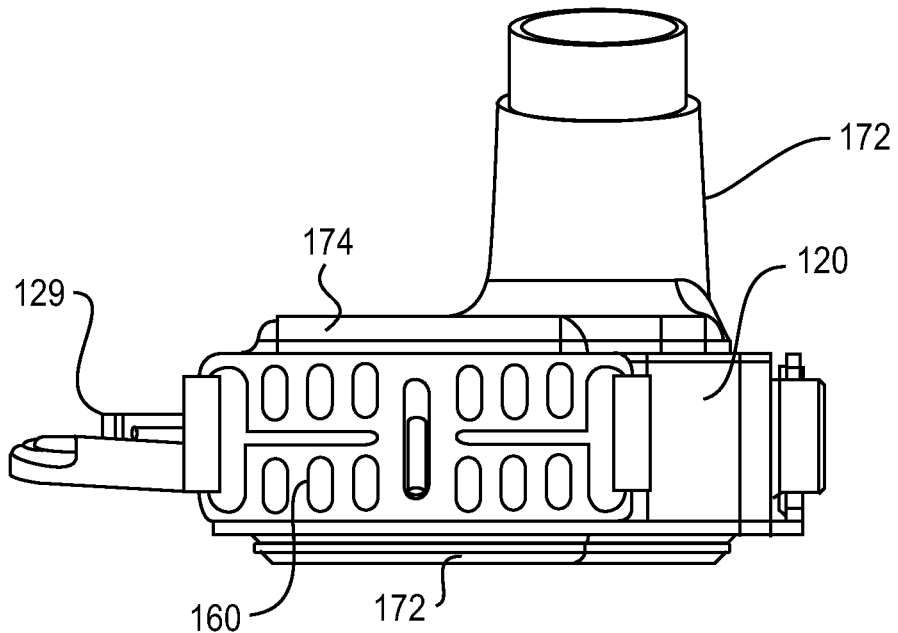
FIG. 13 is a cross-sectional end view of the filter of FIG. 7.
Figure 14:
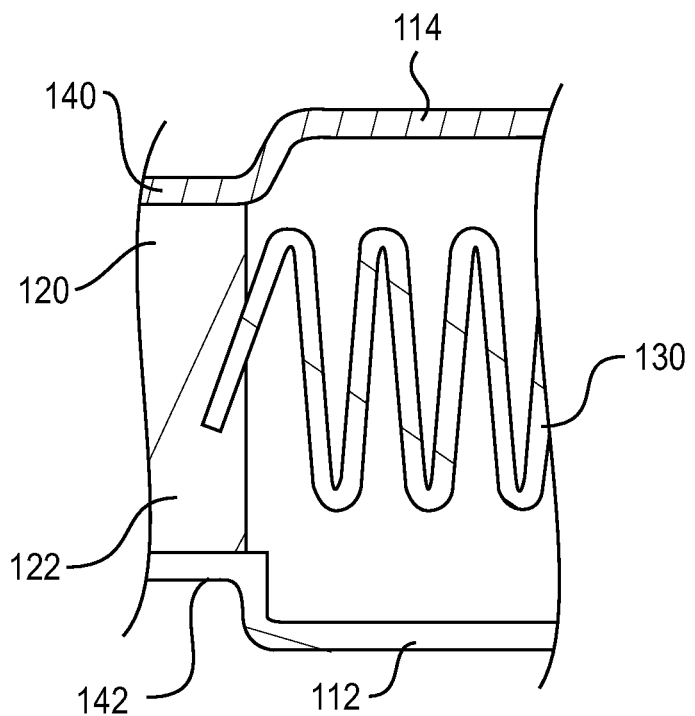
FIG. 14 is a detailed view of a portion of FIG. 11.
Figure 15:
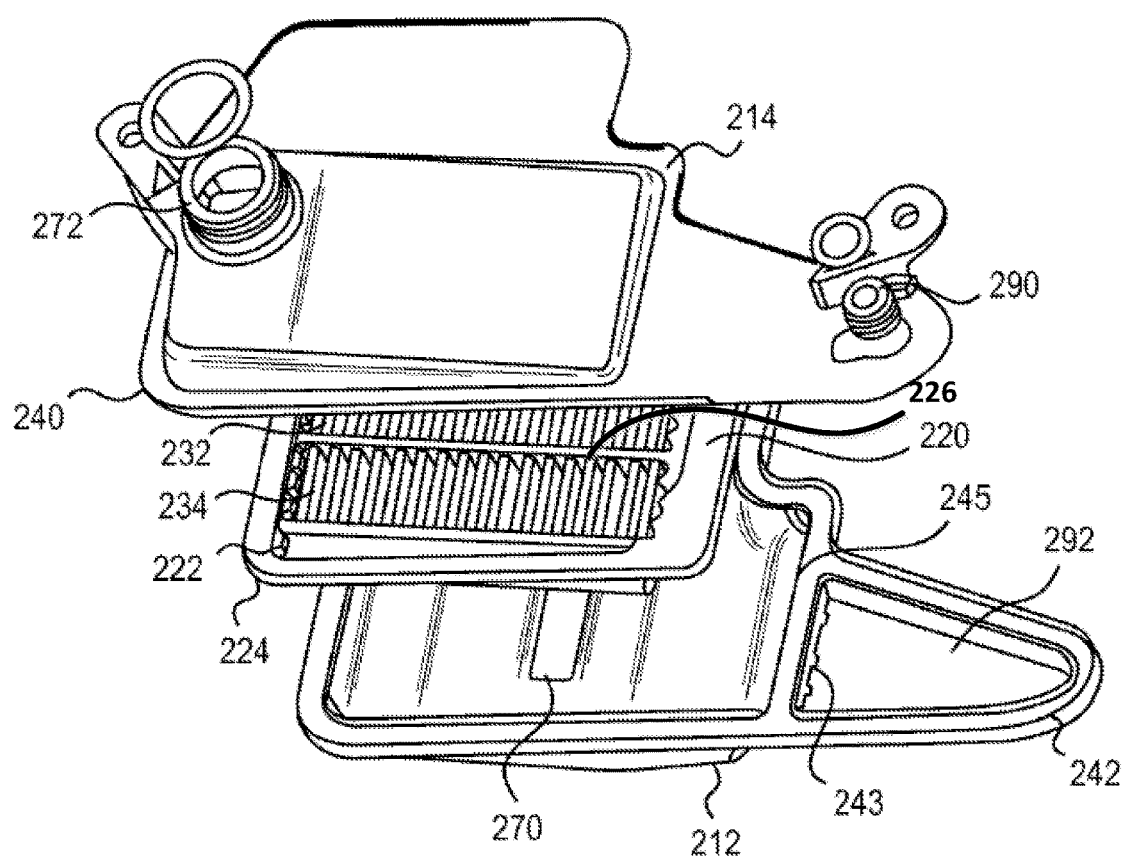
FIG. 15 is an exploded view of the third preferred embodiment of a filter.
Figure 16:
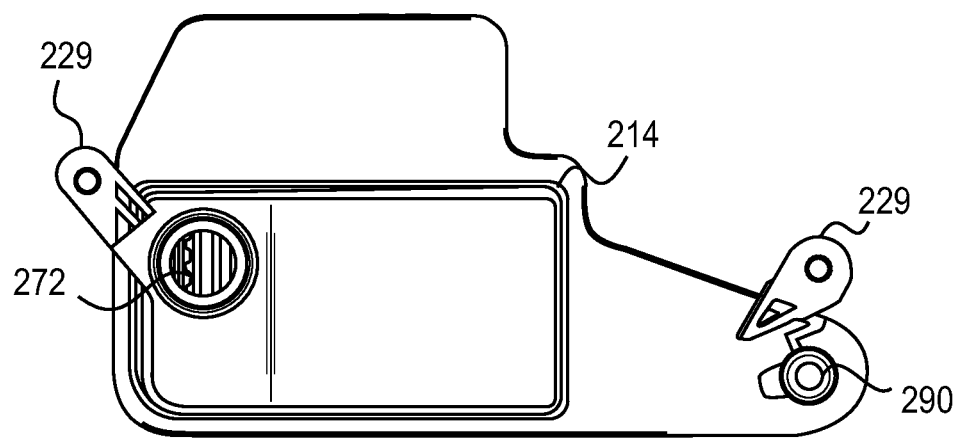
FIG. 16 is a top view of the filter of FIG. 15.
Figure 17:
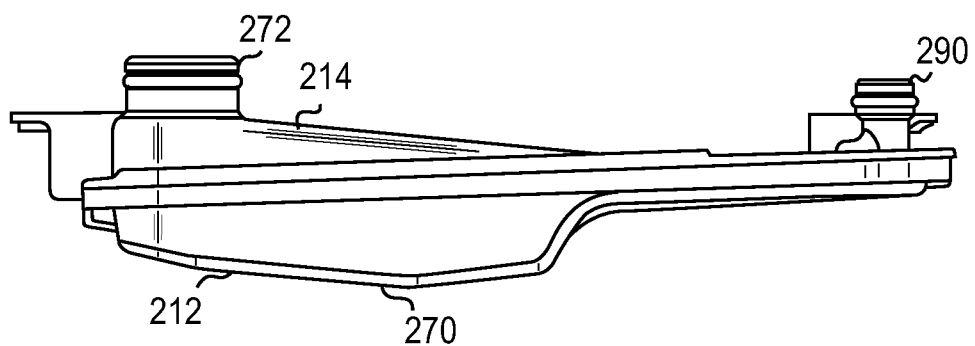
FIG. 17 is a side view of the filter of FIG. 15.

FIG. 12 illustrates the pleat pack 120 having stiffeners 126 thus dividing the media 130 into rows of media. However, some rows or portions of rows can have one type of media, while other rows or portions of rows can have other types of media. For example, in this embodiment one example is that a region 132 of one type of media occupies a different landscape space than a region of media 134. Also, since the frame 122 of the pleat pack 120 is forming an external structural part of the filter's surrounding structure, as well being over-molded to support the media 130, the frame 122 of the pleat pack 120 can be integral with supporting arms or bosses 129. As seen particularly in FIGS. 7 and 13, external devices 160 may be mounted around the frame 122 of the pleat pack 120 and these external devices run 160 may include supports for magnets or other desired external structures. This provides a benefit that the wall thickness of the upper and lower housing 112 and 114 may be relatively thin in order to provide a desired compactness to the filter with the pleat pack 120 providing structural rigidity.

A fluid inlet 170 is provided on the lower housing 112, and a fluid outlet 172 is provided on the upper housing 114.

FIGS. 15-24 illustrate a third preferred embodiment. The variations on materials, number of media types and other variations described with respect to the first embodiment also apply to this embodiment and are not necessarily repeated in the text regarding this embodiment. A filter is provided which includes a lower housing shell 212 and an upper housing shell 214. The upper and lower housing shells may each be made of for example a molded plastic material or metal.

Disposed in between the lower and upper housings 212 and 214 is a pleat pack element 220. The pleat pack element 220 comprises generally a peripheral frame 222 having an outward projecting flange 224, which may also be made of molded plastic. Internal strengthening or dividing ribs 226 may also be provided. The overall assembly including the frame 222, flange 224, and stiffening ribs 226 is over-molded onto filtration media 230 which may comprise one or more media types, such as a first pleated media 232 and a second pleated media 234. In this manufacturing process, at least some or all of the media 230 is pleated or folded in a zigzag fashion and is retained in place within the mold while the plastic is injected into the mold. After cooling, a unitary pleat pack element 220 results. The media 230 is held in place by its interaction with the surrounding plastic structure.

Figure 18:
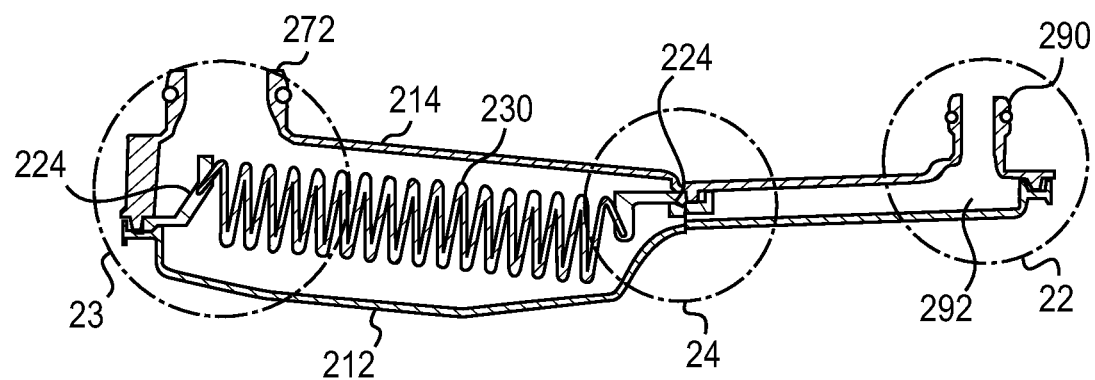
FIG. 18 is a side cross-sectional view of the filter of FIG. 15.
Figure 19:
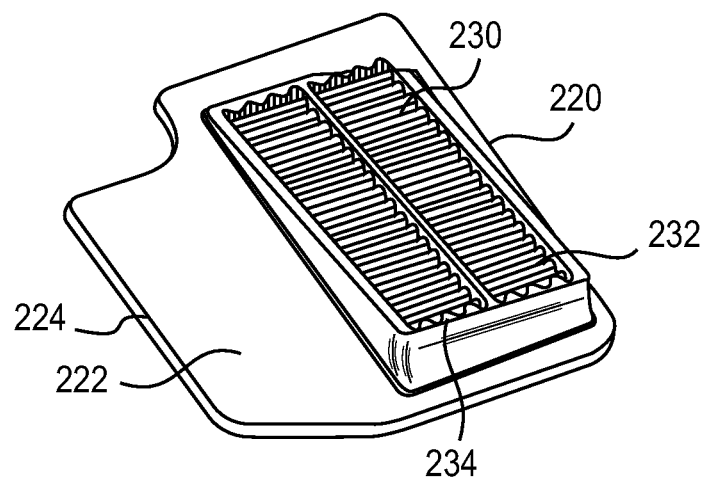
FIG. 19 is a perspective view of a pleat pack element.
Figure 20:
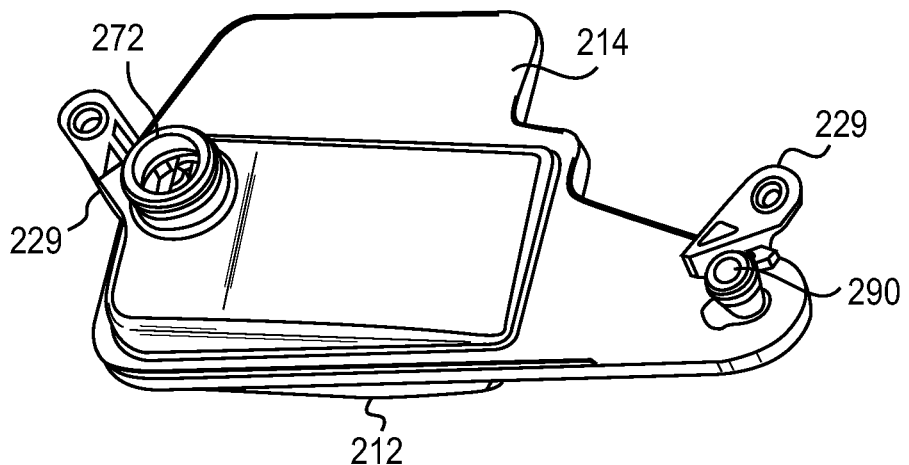
FIG. 20 is a perspective view of the filter of FIG. 15.
Figure 21:
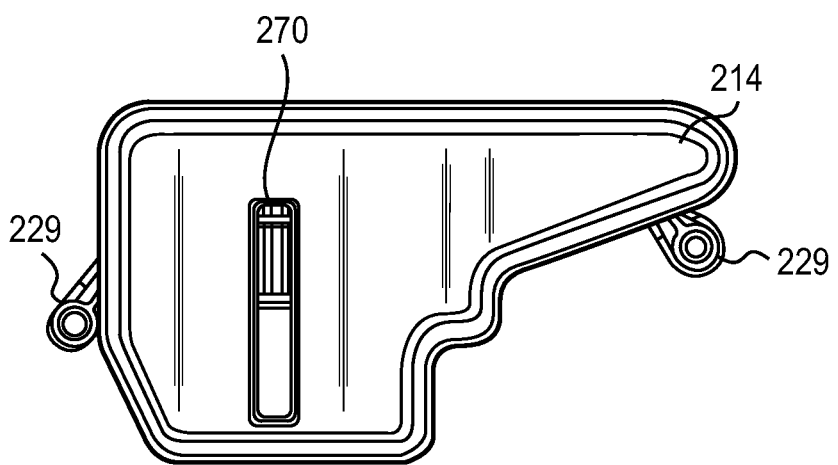
FIG. 21 is a bottom view of the filter of FIG. 15.
Figure 23:
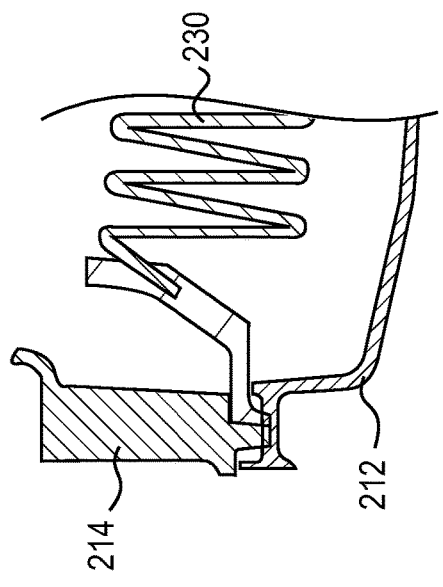
FIG. 23 is a detailed view of a portion of FIG. 18.
Figure 24:
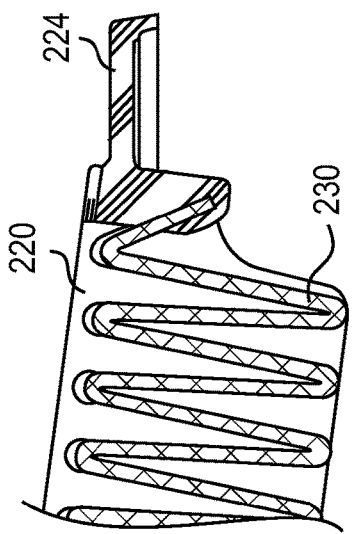
FIG. 24 is a detailed side cross-sectional view of a portion of FIG. 18.
Figure 22:
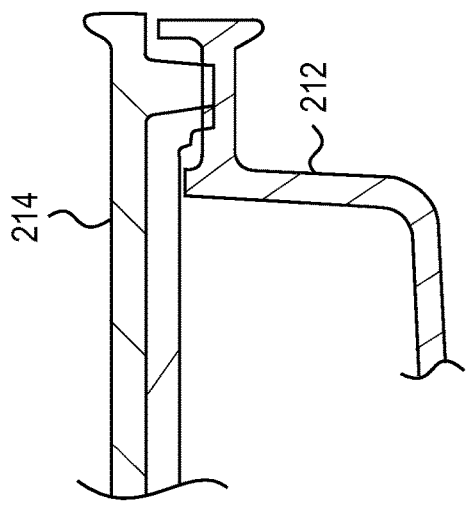
FIG. 22 is a detailed view of a portion of FIG. 18.

Particularly in the detailed view of FIG. 18, it can be seen that the media 230 is encapsulated at its ends and sides within the molded frame 222 during manufacturing. An exposed region of media 230 is provided for fluid to pass through.

The illustrated pleat pack element 220 provides for convenient manufacture in that three separate components can each be individually molded and then assembled to form a finished filter 210. The lower housing 212 and the upper housing 214 are separate components from each other. The pleat pack 220 is also a separate component. The upper housing 214 may have a peripheral flange 240 that can abut against a peripheral flange 242 of the lower housing 212. The flanges 240 and 242 may be vibration welded or friction welded together by a conventional welder. Laser welding or adhesive bonding may also be employed as examples of alternatives. Upon the completion of vibration or other bonding or welding of the flange 240 to the flange 242, the upper housing 214 is now attached to the lower housing 212 to form an enclosure. The pleat pack 220 is trapped due to its shape such that its outer flange 224 is physically retained within the enclosure. Supporting arms or bosses 229 may be provided.

The embodiment of FIGS. 16-24 may also employ an optional additional filter media (not shown in this embodiment, but similar to media 50 and 150 described above). Also, this embodiment shows a bypass outlet 290 from a bypass region 292, that receives fluid via internal housing openings 243 in a region 245 of the lower housing 212. In this embodiment, the region 245 serves as the mating area with the flange 224 at that location, so the bypass fluid through the opening 243 passes around and outside of the pleat pack 220 and is not filtered by the pleat pack 220.

From the illustrated embodiment, the media 230 is in two rows or sections, although it may be in three or four rows or more. The illustrated embodiment shows two sections of media 232 and 234. These sections of media 232 and 234 may be of the same density or one media may be denser than the other. Therefore, it will be appreciated that various degrees of filtration density and efficiency may be provided within one pleat pack 220 if desired.

A fluid inlet 270 is on the lower housing 212 and a fluid outlet 272 is on the upper housing 214.

In all embodiments, where there is a description of joining plastic components to each other, such as for example the housing shells to each other, or the housing shells to the pleat pack frame, it is to be understood than any method of plastic joining may be used at any location, such as vibration welding, laser welding, or even bonding or gluing. Moreover if one or more components are made of metal or have metal at the joining locations, other methods of joining such as crimping may be utilized. Further different media types are referred to as having different densities. This may describe any of many various characteristics such as particle size capture, efficiency, or even material type of characteristics such as porosity or holes through the media. The references herein to housings 12, 14, 112, 114, 212 and 214 may also be considered to refer to housing shells, or housing components. Also it should be noted that where components are described as welded or bonded, those are examples, and other attachment mechanisms such as screws, clips, interlocking teeth, ridges, snap fits, etc. may be used.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only and do not in any way limit the invention, which is defined only by the claims.

What is claimed is:

1. A fluid filter apparatus comprising:
an upper housing shell comprising a fluid outlet and a first peripheral flange;
a lower housing shell comprising a fluid inlet and a second peripheral flange;
a pleat pack assembly comprising a peripheral frame, a first filter medium, and a second filter medium, the peripheral frame defining an opening with first and second sides; and
a third filtration medium; wherein:
the peripheral frame comprises a body portion comprising an inward facing side, an outward facing side, a substantially planar upper surface, and a substantially planar lower surface;
the first filtration medium is a pleated filter medium having a first filtration density;
the second filtration medium is a pleated filter medium having a second filtration density that differs from the first filtration density;
the first filtration medium and second filtration medium are supported within said opening with a first side of said first filtration medium and a first side of said second filtration medium oriented towards the first side of said opening, and a second side of the first filtration medium and a second side of the second filtration medium oriented towards the second side of said opening;
the third filtration medium is configured to filter fluid flowing therethrough;
the third filtration medium comprises a plurality of holes, said plurality of holes configured to allow at least a portion of fluid to bypass the third filtration medium without being filtered thereby;
the third filtration medium is disposed proximate said first side or said second side of said opening;
the third filtration medium has a third filtration density that differs from said first filtration density and said second filtration density;
the substantially planar upper and lower surfaces each extend from and span an entire thickness between the inward facing side to the outward facing side of the peripheral frame;
the substantially planar upper surface is coupled directly to the first peripheral flange; and
the substantially planar lower surface is coupled directly to the second peripheral flange.

2. The filter of claim 1, wherein:
the second side of said opening is oriented toward said fluid inlet; and
the third filtration medium is disposed between said inlet and the second side of said opening.

3. The filter according to claim 1, wherein the inward and outward facing sides each extend perpendicularly from a first plane that is contiguous with and extends parallel to the substantially planar upper surface to perpendicularly intersect a second plane that is contiguous with and extends parallel to the substantially planar lower surface.

4. The filter according to claim 1, wherein all of the substantially planar top surface is coupled directly to the upper housing shell, and all of the substantially planar lower surface is coupled directly to the lower housing shell.

5. The filter according to claim 1, wherein the first and second flange are joined together by a weld.

6. The filter according to claim 1, further comprising at least one rib bisecting the opening of said peripheral frame.

7. A fluid filter apparatus comprising:
a housing forming an enclosure, the housing comprising an upper housing shell comprising a first peripheral flange and a fluid outlet, and a lower housing shell comprising a second peripheral flange and a fluid inlet; and
a pleat pack assembly comprising a peripheral frame, a first filter medium, and a second filtration medium, the peripheral frame defining an opening with first and second sides; and
a third filtration medium; wherein:
the peripheral frame comprises a body portion comprising an inward facing side, an outward facing side, a substantially planar upper surface, and a substantially planar lower surface;
the first filtration medium is a pleated filter medium having a first filtration density;
the second filtration medium is a pleated filter medium having a second filtration density that differs from the first filtration density;
the first filtration medium and second filtration medium are supported within said opening in a parallel arrangement in a direction of fluid flow with respect to each other;
a first side of said first filtration medium and a first side of said second filtration medium are oriented towards the first side of said opening, and a second side of the first filtration medium and a second side of the second filtration medium are oriented towards the second side of said opening;
the third filtration medium is configured to filter fluid flowing therethrough;
the third filtration medium comprises a plurality of holes, said plurality of holes configured to allow at least a portion of fluid to bypass the third filtration medium without being filtered thereby;
the third filtration medium is disposed proximate said first side or said second side of said opening
the third filtration medium has a third filtration density that differs from said first filtration density and said second filtration density;
the substantially planar upper and lower surfaces each extend from and span an entire thickness between the inward facing side to the outward facing side of the peripheral frame;
the substantially planar upper surface is coupled directly to the first peripheral flange; and
the substantially planar lower surface is coupled directly to the second peripheral flange e.

8. The filter according to claim 7, wherein:
the second side of said opening is oriented toward said fluid inlet; and
the third filtration medium is disposed between said inlet and the second side of said opening.

9. The filter according to claim 7, wherein the inward and outward facing sides each extend perpendicularly from a first plane that is contiguous with and extends parallel to the substantially planar upper surface to perpendicularly intersect a second plane that is contiguous with and extends parallel to the substantially planar lower surface.

10. The filter according to claim 7, further comprising at least one rib bisecting the opening of said peripheral frame.

11. A method of making a fluid filter apparatus comprising:
provided a housing comprising an upper housing shell comprising a first peripheral flange and a fluid outlet, and lower housing shell comprising a second peripheral flange and a fluid inlet;
providing a pleat pack assembly at least in part by providing a peripheral frame for supporting a first filtration medium and a second filtration medium, the peripheral frame defining an opening having first and second sides;
providing a third filtration medium; and
forming an enclosure; wherein:
the peripheral frame comprises a body portion comprising an upper surface, a lower surface, a substantially planar upper surface, and a substantially planar lower surface;
the first filtration medium is a pleated filter medium having a first filtration density;
the second filtration medium is a pleated filter medium having a second filtration density that differs from the first filtration density;
in said pleat pack assembly:
the first filtration medium and second filtration medium are supported within said opening in a parallel arrangement in a direction of fluid flow with respect to each other;
a first side of said first filtration medium and a first side of said second filtration medium are oriented towards the first side of said opening; and
a second side of the first filtration medium and a second side of the second filtration medium are oriented towards the second side of said opening;
the third filtration medium is configured to filter fluid flowing therethrough;
the third filtration medium comprises a plurality of holes, said plurality of holes configured to allow at least a portion of fluid to bypass the third filtration medium without being filtered thereby;
the third filtration medium is disposed proximate said first side or said second side of said opening;
the third filtration medium has a third filtration density that differs from said first filtration density and said second filtration density;
the substantially planar upper and lower surfaces each extend from and span an entire thickness between the inward facing side to the outward facing side of the peripheral frame;
forming said enclosure comprises welding the first peripheral flange directly to the substantially planar upper surface and welding the second peripheral flange directly to the substantially planar lower surface, such that the first filtration medium, second filtration medium and third filtration medium are each disposed within a cavity defined by the upper housing shell, the lower housing shell, and the peripheral frame.

12. The method according to claim 11, wherein:
the second side of said opening is oriented toward said fluid inlet; and
the third filtration medium is disposed between said inlet and the second side of said opening.

13. The method according to claim 11, wherein the inward and outward facing sides each extend perpendicularly from a first plane that is contiguous with and extends parallel to the substantially planar upper surface to perpendicularly intersect a second plane that is contiguous with and extends parallel to the substantially planar lower surface.

14. The method according to claim 11, wherein said pleat pack assembly further comprises at least one rib bisecting the opening of said peripheral frame.

15. The filter of claim 1, wherein the third filtration medium is separate from the pleat pack and is secured between the pleat pack and the lower housing shell.

16. The filter of claim 1, wherein the third filtration medium is a flat sheet type media and wherein the plurality of holes are spaced evenly through the third filtration medium.

17. The filter of claim 1, wherein a first subset of the plurality of holes of the third filtration medium are disposed adjacent to the first filtration medium and a second subset of the plurality of holes of the third filtration medium are disposed adjacent to the second filtration medium.

18. The filter of claim 1, wherein the filter is configured to always allow fluid to flow through said plurality of holes of the third filtration medium.

19. The filter of claim 8, wherein the third filtration medium is separate from the pleat pack and is secured between the pleat pack and the lower housing shell.

20. The filter of claim 8, wherein the third filtration medium is a flat sheet type media and wherein the plurality of holes are spaced evenly through the third filtration medium.

21. The filter of claim 8, wherein a first subset of the plurality of holes of the third filtration medium are disposed adjacent to the first filtration medium and a second subset of the plurality of holes of the third filtration medium are disposed adjacent to the second filtration medium.

22. The filter of claim 8, wherein the filter is configured to always allow fluid to flow through said plurality of holes of the third filtration medium.

23. The method of claim 11, wherein the third filtration medium is provided separately from the pleat pack and is secured between the pleat pack and the lower housing shell.

24. The method of claim 11, wherein the third filtration medium is a flat sheet type media and wherein the plurality of holes are spaced evenly through the third filtration medium.

25. The method of claim 11, wherein a first subset of the plurality of holes of the third filtration medium are disposed adjacent to the first filtration medium and a second subset of the plurality of holes of the third filtration medium are disposed adjacent to the second filtration medium.

26. The method of claim 11, wherein the filter is configured to always allow fluid to flow through said plurality of holes of the third filtration medium.

* * * * *